United States Patent [19]

Williams

[11] Patent Number: 4,557,971

[45] Date of Patent: Dec. 10, 1985

[54] MULTIPLE LAYERED MARKABLE AND SELF-ADHEREABLE TAPE

[76] Inventor: Robert Williams, 9104 Rott Rd., St. Louis, Mo. 63127

[21] Appl. No.: 612,030

[22] Filed: May 18, 1984

[51] Int. Cl.[4] ............................ C09J 7/02; B32B 27/10
[52] U.S. Cl. ........................................ 428/343; 428/40; 428/354; 428/507; 428/511; 428/512
[58] Field of Search .................. 428/42, 40, 172, 343, 428/346, 352, 354, 507, 511, 512

[56] References Cited

U.S. PATENT DOCUMENTS 4,041,202  8/1977  Williams ........................ 428/172 X
4,351,877  9/1982  Williams .......................... 428/42 X

*Primary Examiner*—Thomas J. Herbert

*Attorney, Agent, or Firm*—Rogers, Howell, Moore & Haferkamp

[57] ABSTRACT

A multiple layered laminated tape has a permeable layer on its face. The permeable layer provides a suitable surface for printing or marking. The permeable layer is laminated to an upper strength layer made of a film of pre-stretched polypropylene or the like. The upper strength layer is laminated to a weak carrier layer of low bond Kraft paper. The carrier layer has a layer of water soluble adhesive which is used to secure the tape to a cardboard carton or the like. The water soluble adhesive is also suitable for sticking to the permeable layer face of the tape so that the tape may be stuck to itself. Labels, stamps or the like having a water soluble adhesive may also be glued to the face of the tape.

11 Claims, 5 Drawing Figures

MULTIPLE LAYERED MARKABLE AND SELF-ADHEREABLE TAPE

BACKGROUND AND SUMMARY

Multiple layered adhesive tapes for sealing carton flaps either during or after manufacture are well known in the art. Applicant is the inventor of two such tapes, disclosed and claimed in U.S. Pat. No. 4,041,202 issued Aug. 9, 1977 and in U.S. Pat. No. 4,351,877 issued Sept. 28, 1982. U.S. Pat. No. 4,041,202 solved problems in the prior art and provided a delamintable tape which could be stripped away to leave two lateral portions of a bottom layer separated on the two side of a joint thereby to release the pieces being joined.

Similarly, U.S. Pat. No. 4,351,877 solved problems in the prior art and provided a strippable laminated tape by utilizing a plastic layer for strength and a thin carrier layer to hold the adhesive. The carrier layer is made of low internal bond paper which separated when the plastic layer was pulled, leaving a thin easily breakable layer.

In the prior art, multiple layered tapes have not solved the problem of markability on the face of the tape. Single layer Kraft tapes are markable, but do not provide strength needed for certain applications. If a fiber reinforcing layer is provided, there is difficulty in attaching a Kraft face to the rough and uneven surface of the tape. Further, because of the unevenness of the fibers, substantial adhesive would be required to secure a Kraft face to the fibers. Finally, because the Kraft paper face is of substantial thickness, it, along with the already heavy fiber, makes the tape thicker, thus making the tape rolls larger and more difficult to store, inflexible, and costlier.

Because of these problems with using fibers to provide strength, many tapes now utilize a plastic layer. The plastic layer simultaneously solves the problem of strength and thickness. However, the plastic layer, when used on the tape face, does not provide a suitable surface for marking with pen, pencil, inked rubber stamp or the like.

It is generally difficult to print on a plastic faced tape. Pre-printing on the plastic face of the tape is costly since a special printing process must be used. Applicant's own U.S. Pat. No. 4,351,877 may have messages pre-printed on the carrier layer prior to manufacture of the tape with the pre-printed message showing through the clear plastic face of the tape. However the message desired must be determined prior to the manufacture of the tape. An inventory of tapes with many possible messages must be accumulated. Further, if a customized message is desired, such as a company name, the entire tape must be manufactured.

Another problem with plastic faced tapes is the adhereability. Adhesives which are suitable for sticking to plastic-faced tapes are generally known in the art. If the adhesive is not water soluble, then it must be preapplied to the label or tag in a tacky condition. By using a non-water soluble adhesive, the labels or tags are generally more expensive. Further, labels, stamps, etc., which have a water soluble adhesive, must be carefully placed so that they are not on top of the plastic face of the tape. This is a serious disadvantage if a significant number of cartons are labeled because of reduced productivity and efficiency.

An inherent problem with plastic faced tapes is that they are not easily self-adhereable (i.e. the tape cannot adhere to the top of itself). Plastic faced tapes with a water based gumming layer, such as applicant's own U.S. Pat. No. 4,351,877, provided a strippable thin tape, but did not solve the problem of self-adhereability.

Non-self-adhereable tapes have several disadvantages. First, if a carton is to be completely wrapped with tape around the circumference of a carbon, non-selfadhereable tapes would have to be carefully cut so that no overlap would occur. If the tape could be overlapped there is added strength, thus reducing the possiblity of carton breakage. Overlapped tape will also provide a continuous seal to keep foreign objects out of the interior of the box. Additionally, a non-self-adhereable tape cannot be criss-crossed on the carton for additional strength.

Accordingly, applicant has solved these problems. Applicant has combined the advantages of a plastic strength layer tape with the advantages of a paper tape. By uniting a thin low bond paper on one face of the plastic layer, a permeable outer surface is provided. The permeable layer may be colored, thus providing an aesthetically pleasing tape. Also, the tape may be written on by pen, marker, or the like for addresses or for stamping of messages. This permeable surface can be used for pre-printed messages, such as "Handle with Care", or "Fragile" so that the tape serves not only to seal a carton but to communicate a message. The tape can be manufactured prior to choosing the desired message, and then stored, thus minimizing the inventory needed.

The permeable layer also provides a suitable surface for gluing on stamps, labels or the like. The surface is suitable for both water soluble and non-water soluble adhesives This allows less costly labels with water soluble adhesive to be used. Further, the labels and stamps need not be carefully placed thus reducing the time needed for carton preparation.

This novel tape is also self-adhereable. A water soluble gumming layer is used for applying this tape to a carton or the like. The tape may be overlapped on the carton by sticking the gumming layer to the permeable layer. This overlapping of the tape provides additional strength to reduce carton breakage, and a continuous seal.

Applicant's tape also incorporates the advantages of applicant's prior invention in U.S. Pat. No. 4,351,877. The plastic layer provides strength for the tape and at the same time is thinner, smoother, more flexible, and less costly than a fiber reinforced tape. By covering the plastic with a permeable layer, the disadvantage of plastic's water resistance is overcome by the presence of the permeable layer. Applicant has also incorporated features by use of a carrier layer adhering to the plastic layer. First, the carrier layer provides a surface to "carry" a water soluble adhesive for sticking to the carton. Second, the carrier layer may be made of low internal bond which separates internally when the stripping of the upper strength layer.

In applicant's alternative embodiment the carrier layer and the permeable layer are interchanged. Because the permeable layer is thinner than the carrier layer, less adhesive will be used for the water soluble adhesive layer. Second, since the carrier layer is thicker than the permeable layer, printing or writing on the face of the tape will be better absorbed. Finally, by placing the carrier layer opposite the water soluble adhesive, the tendency of the tape to curl when wet is reduced.

DETAILED DESCRIPTION OF THE PREFERRED EMBODIMENT

Figure 1:
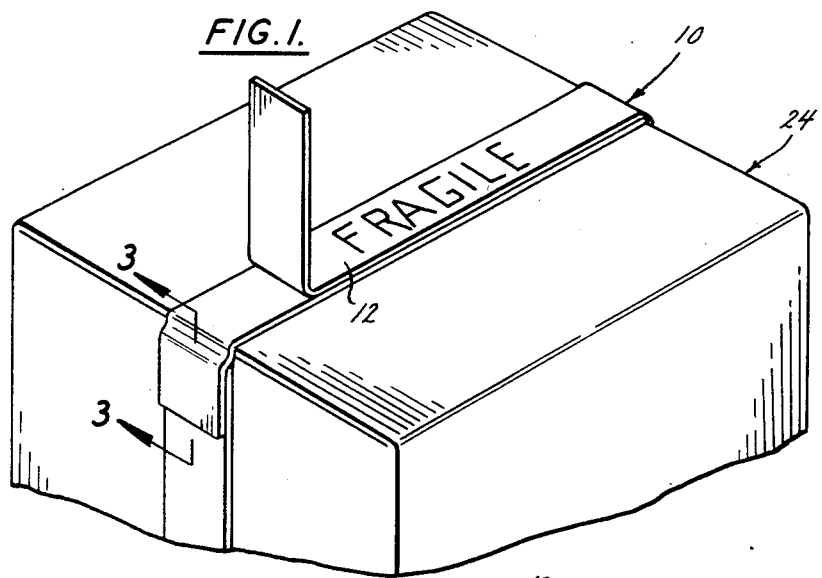
FIG. 1 is a perspective view of applicant's tape applied and overlapped to seal the flaps of a carton with the upper strength layer stripped away to show the lower carrier layer for both non-overlapped and overlapped portions.
Figure 2:
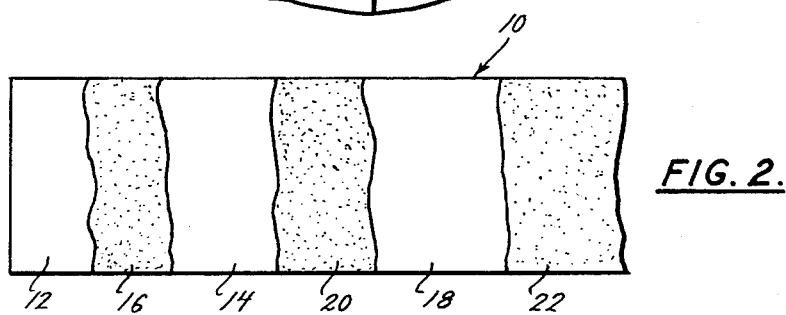
FIG. 2 is a top view of applicant's tape with portions broken away to expose the multiple layers.

The multiple layer laminated tape 10 has an upper permeable layer 12 laminated to an upper strength layer 14 by an adhesive layer 16. Strength layer 14 is laminated to a lower carrier layer 18 by an adhesive layer 20 therebetween. The carrier layer 18 has a gumming layer 22 which secures the tape to the carton 24. The gumming layer 22 may be a water soluble adhesive film of vegetable or animal gum for convenience and use of standard Kraft-type tape dispensers.

The permeable layer 12 may be made of low bond, ten pound (4.5 kg) to thirty pound paper (13.6 kg). This permeable layer 12 provides a thin surface which may be written or printed on with pen, pencil, marker or the like. Messages such as the company name or frequently used warnings such as "Fragile" or "Handle With Care" may be printed on the tape 10 so as to reduce or eliminate further marking on the carton 24.

Figure 3:
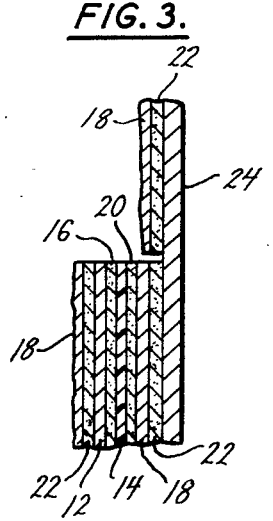
FIG. 3 is an enlarged cross-sectional view along the plane line 3—3 of FIG. 1 with the thickness of each layer exaggerated.
Figure 4:
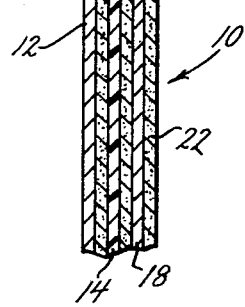
FIG. 4 is a cross-sectional view with the thickness of each layer exaggerated.

The permeable layer 12 also provides an adhereable surface. Stamps and labels will adhere to the permeable layer 12 even if they use a water based adhesive. The tape will stick to itself by applying gumming layer 22 on top of permeable layer 12 as shown in FIG. 3. Because of its porosity, layer 12 will absorb the gumming adhesive of layer 22. The tape 10 can then be wrapped around the entire carton 24 providing a continuous seal to keep out foreign matter and to keep in any objects in the carton 24.

The strength layer 14 may be formed from a film of pre-stretched and oriented polypropylene or high density polyethylene plastic. This plastic film provides a substantially smooth and thin layer of strengthening material to form the body of the tape. Both laminating adhesive layers 16 and 20 may be any adhesive as is commonly used for gluing plastic films to paper, as is known in the art. The carrier layer 18 may be twenty five pound (11.3 kg) to forty pound (18.1 kg) Kraft or the like and is thicker than the permeable layer 12. As the carrier layer 18 is laminated to the strength layer 14, the strength layer 14 provides virtually all the necessary stength required to withstand the forces encountered during use. The carrier layer 18 serves as a medium to "carry" the water soluble adhesive that otherwise could not be applied onto the plastic layer, and to provide the longitudinal rigidity to permit the tape 10 to be dispensed.

Figure 5:
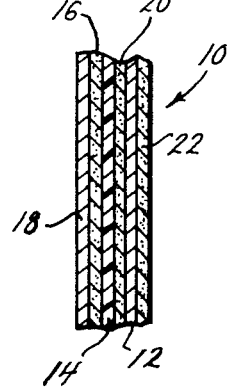
FIG. 5 is an enlarged cross-sectional view of the alternative embodiment with each layer exaggerated.

In the alternate embodiment shown in FIG. 5, the carrier layer 18 is interchanged with the permeable layer 12. The permeable layer 12 retains the gumming layer 22 and the carrier layer 18 now provides a porous surface for writing. This embodiment would be preferred if a a heavier bond paper is needed for printing or writing on the face of the tape. This embodiment also requires a thinner gumming layer 22 since the permeable layer 12 will absorb less of the gumming adhesive.

OPERATION OF THE TAPE

The tape 10 may be dispensed from a tape dispensing machine (not shown) which automatically moistens the gumming layer 22 and cuts the tape to length. Several tape dispensing machines may be loaded, each with a different pre-printed message, thus making the carton sealing speedier and more efficient. Further, because each carton may require a different message, the decision on the message to be applied is made while the interior of carton 24 is still accessible for easy determination of its contents.

The tape 10 is applied to the carton 24 and may be overlapped, as shown in FIG. 1. When applied with an overlap the tape 10 provides a continuous seal around the carbon 24. When it is desired to remove the tape 10 from the carton, the strength layer 14 is peeled back in a lengthwise direction. Because the strength layer 14 is stronger than carrier layer 18, the strength layer 14 can be stripped or delaminated with little chance of incomplete stripping, as shown in FIG. 3.

Once the strength layer 14 has been delaminated, the portion of the carrier layer 18 that remains may be easily broken along the edge of the carton flaps to complete opening of the carton. In the alternate embodiment, a portion of permeable layer 12 remains after the delamination and can be easily broken along the edge of the carton flap to complete opening of the carton.

There are various changes and modifications which may be made to applicant's invention as would be apparent to those skilled in the art. However, any of these changes or modifications are included in the teaching of applicant's disclosure and he intends that his invention be limited only by the scope of the claims appended hereto.

I claim:

1. In an improved multiple layered tape; a non-adhereable plastic, strength layer of the tape not suited for the adherence to it of water-soluble glue, a carrier layer united on one side of the non-adhereable layer and capable of holding a water-soluble adhesive and a water-soluble adhesive film, suitable for adherence to cartons and the like, on the side of the carrier layer opposite the non-adhereable layer, a permeable layer united to the surface of the non-adhereable layer on the side opposite the carrier layer, said permeable layer being a surface suitable to be written or printed upon and said permeable layer capable of being adhered to by the water-soluble adhesive film.

2. The tape of claim 1 wherein the permeable layer is made of low internal bond paper.

3. The tape of claim 1 wherein the strength layer is made of plastic material strong enough to be stripped from an object such as carton flaps to which the tape has been applied, and the carrier layer is made of material so weak that when the tape is stripped from the object upon which it is adhered, any parts of the carrier remaining on the object are readily breakable to permit the carton flaps to be easily separated.

4. A thin tape for such use as sealing carton tops together, comprising a thin film of strong plastic material to provide a strength layer, a thin permeable layer united to one side of the strength layer; a weak, thin carrier layer united to the other side of the strength layer; and a water-soluble adhesive film on the opposite side of the carrier layer, said permeable layer able to be adhered to by said water-soluble adhesive film; the strength layer of plastic material being non-rigid, flexible and floppy, and hence unable to be dispensed lengthwise from a tape dispenser, the permeable layer suited to be written or printed upon, and the plastic being unable to hold a coating of water-soluble adhesive, the carrier layer being of thin paper-like material continuous and unbroken laterally across the strength layer, the carrier material being capable of holding the water-soluble adhesive film, and also of being united to the plastic film, and the adhesive film being on the exposed face of the carrier layer opposite the plastic film.

5. The tape of claim 4 wherein the plastic film and the carrier layer when thus united have sufficient stiffness to enable the resulting tape to be fed lengthwise from a tape dispenser.

6. The tape of claim 4 wherein the strength layer is made of oriented polypropylene.

7. The tape of claim 4 wherein the strength layer is made of high density polyethylene.

8. The tape of claim 4 wherein the carrier layer is made of Kraft paper or the like.

9. The tape of claim 4 wherein the permeable layer is made of very low internal bond paper.

10. The tape of claim 4 wherein the strength layer is made of plastic material strong enough to be stripped from an object such as carton flaps to which the tape has been applied, and the carrier layer is made of material so weak that when the tape is stripped from the object upon which it is adhered, any parts of the carrier remaining on the object are readily breakable to permit the carton flaps to be easily separated.

11. The tape of claim 10 wherein the carrier layer is made of low internal bond paper so that at least partial separation of said carrier layer is to be expected as the strength layer is delaminated therefrom.

* * * * *